(12) United States Patent
Masuda et al.

(10) Patent No.: US 11,940,624 B2
(45) Date of Patent: Mar. 26, 2024

(54) OPTICAL DEVICE AND WEARABLE IMAGE DISPLAY DEVICE

(71) Applicant: Blue Optech Co., Ltd., Kyoto (JP)

(72) Inventors: Makoto Masuda, Kyoto (JP); Nobuhiro Shirai, Kyoto (JP)

(73) Assignee: BLUE OPTECH CO., LTD., Kyoto (JP)

( * ) Notice: Subject to any disclaimer, the term of this patent is extended or adjusted under 35 U.S.C. 154(b) by 437 days.

(21) Appl. No.: 17/271,942

(22) PCT Filed: Jul. 23, 2019

(86) PCT No.: PCT/JP2019/028818
§ 371 (c)(1),
(2) Date: Feb. 26, 2021

(87) PCT Pub. No.: WO2020/066248
PCT Pub. Date: Apr. 2, 2020

(65) Prior Publication Data
US 2021/0318542 A1    Oct. 14, 2021

(30) Foreign Application Priority Data

Sep. 27, 2018 (JP) ................................ 2018-181270

(51) Int. Cl.
*G02B 27/01* (2006.01)
*F21V 8/00* (2006.01)

(52) U.S. Cl.
CPC ....... *G02B 27/0172* (2013.01); *G02B 6/0035* (2013.01); *G02B 2027/0178* (2013.01)

(58) Field of Classification Search
CPC .......................... G02B 27/017; G02B 27/0172
See application file for complete search history.

(56) References Cited

U.S. PATENT DOCUMENTS 8,908,280 B2    12/2014    Kobayashi
10,078,222 B2    9/2018    Komatsu et al.
(Continued)

FOREIGN PATENT DOCUMENTS

CN    102213832 A    10/2011
CN    107111144 A    8/2017
(Continued)

OTHER PUBLICATIONS

CNIPA First Office Action for corresponding CN Application No. 201980048512.6, dated Mar. 29, 2022.
(Continued)

*Primary Examiner* — Michael Stahl
(74) *Attorney, Agent, or Firm* — CANTOR COLBURN LLP

(57) ABSTRACT

An optical device and a wearable image display device are provided with a light guiding plate, a plurality of half mirrors, and an incident angle adjustment member. The optical member that causes the video light to be incident as a virtual image on a person's eye and be displayed as a display image, and has a reflection characteristic that a part of the video light is reflected on a back surface thereof. The incident angle adjustment member is an optical member configured to adjust the incident angle of the video light according to the reflection characteristic of the half mirror to form video light that does not satisfy a total reflection condition in another part of the video light, to balance the brightness of the display image.

7 Claims, 11 Drawing Sheets

(56) References Cited

U.S. PATENT DOCUMENTS

| | | |
|---|---|---|
| 2005/0180687 A1 | 8/2005 | Amitai |
| 2008/0025667 A1* | 1/2008 | Amitai ............... G02B 6/003 385/36 |
| 2008/0158685 A1 | 7/2008 | Amitai |
| 2011/0241975 A1 | 10/2011 | Mukawa et al. |
| 2011/0248904 A1 | 10/2011 | Miyawaki et al. |
| 2011/0248905 A1 | 10/2011 | Chosokabe et al. |
| 2013/0250430 A1 | 9/2013 | Robbins et al. |
| 2016/0178909 A1 | 6/2016 | Komatsu et al. |
| 2016/0341964 A1 | 11/2016 | Amitai |
| 2017/0255014 A1 | 9/2017 | Komatsu et al. |
| 2017/0336552 A1 | 11/2017 | Masuda et al. |
| 2017/0363799 A1 | 12/2017 | Ofir et al. |
| 2018/0081177 A1 | 3/2018 | Yoshida et al. |
| 2018/0180884 A1 | 6/2018 | Yoshida |
| 2018/0246333 A1 | 8/2018 | Cheng et al. |

FOREIGN PATENT DOCUMENTS

| | | |
|---|---|---|
| CN | 107167919 A | 9/2017 |
| CN | 107861243 A | 3/2018 |
| JP | 4508655 B2 | 7/2010 |
| JP | 5678460 B2 | 3/2015 |
| JP | 2018503121 A | 2/2018 |
| JP | 2018106104 A | 7/2018 |
| TW | 201802507 A | 1/2018 |

OTHER PUBLICATIONS

EPO Extended Search Report for corresponding EP Application No. 19864677.0, dated Mar. 9, 2022.

International Search Report for International Application No. PCT/JP2019/028818; dated Sep. 24, 2019.

* cited by examiner

OPTICAL DEVICE AND WEARABLE IMAGE DISPLAY DEVICE

CROSS REFERENCE TO RELATED APPLICATIONS

This is the U.S. national stage of application No. PCT/JP2019/028818, filed on Jul. 23, 2019. Priority under 35 U.S.C. § 119(a) and 35 U.S.C. § 365(b) is claimed from Japanese Application No. 2018-181270, filed Sep. 27, 2018, the disclosure of which is also incorporated herein by reference.

TECHNICAL FIELD

The present invention relates to an optical device comprising a light guide and a plurality of half mirrors, and a wearable image display.

BACKGROUND ART

Examples of such optical devices or wearable image displays are shown in PTL 1 and PTL 2 respectively. The light guide optical device disclosed in PTL 1 includes a flat substrate and a plurality of selective reflecting surfaces arranged in the flat substrate. In the light guide optical device of PTL 1, light incident on the flat substrate is reflected several times on the surface of the flat substrate, and then emitted from the flat substrate at the selective reflecting surface to be displayed as an image.

The head-mounting display disclosed in PTL 2 includes a light guide plate and a plurality of half mirrors arranged in the light guide plate. In the head-mounting display of PTL 2, light incident on the light guide plate is guided to propagate through the inside of the light guide plate, emitted from the light guide plate by half mirrors, and displayed as an image.

CITATION LIST

Patent Literature

PTL 1 JP 4508655B
PTL 2 JP 5678460B

SUMMARY OF INVENTION

However, in the light guide optical device disclosed in PTL 1, brightness of the displayed image cannot be balanced because brightness of one side portion of the display image tends to be reduced, or tends to be dark, compared with that of the other side portion of the display image, caused by reflection characteristics of the selective reflection surface (see the reflection characteristics of the half mirror 3 described later). Similarly in the head-mounted display disclosed in PTL 2, brightness of the displayed image cannot be balanced because brightness of one side portion of the display image tends to be reduced, or tends to be dark, compared with that of the other side portion of the display image, caused by reflection characteristics of a half mirror (see also the reflection characteristics of the half mirror 3 described later).

If the brightness of the displayed image is not balanced, the user looking at the displayed image may feel uncomfortable. For this reason, it is important for an optical device and a wearable image display to easily balanced of the brightness of the displayed image so that the user does not feel uncomfortable when user the looking at the displayed image.

An object to be solved by the present invention is to provide an optical device and a wearable image display in which brightness of a display image can be easily balanced.

Solution to Problem

An optical device according to the present invention comprises: a light guide with a main surface; a plurality of half mirrors arranged in the light guide; and an incident angle adjusting member, the light guide being an optical member for guiding incident image light from one part to other part by the light guiding nature of the main surface; each of the plurality of half mirrors being optical member displaying a virtual image as a display image by entering into a human eye as the virtual image after making the image light traveling through the light guide by the light guide nature thereof emit outside, and having a reflection characteristic for a part of the image light to be reflected on a back surface opposing to the human eye; the incident angle adjusting member being an optical member for adjusting the incident angle of the image light on the main surface of the light guide in accordance with the reflection characteristics of each of the half mirrors to form an image light not satisfying the total reflection condition on the main surface in the other part of the image light, to balance the brightness of the displayed image.

In the optical device according to this invention, it is preferable that the incident angle adjusting member is an optical member for adjusting the refractive index of the light guide and the incident angle of the image light on the main surface of the light guide in accordance with the reflection characteristics of each of the plurality of half mirrors to form an image light that does not satisfy the total reflection condition on the main surface in the other part of the image light, to balance the brightness of the displayed image.

In the optical device according to this invention, it is preferable that the image light has an image light angle corresponding to the angle of view of the display image; a center image light passing through the center line of the image light angle in the image light corresponds to the center of the display image; a one side image light passing through a half straight line in one side of the image light angle in the image light corresponds to one end of the display image; an other side image light passing through another half straight line in the other side of the image light angle in the image light corresponds to the other end of the display image; each of the plurality of half mirrors is an optical member having a reflection characteristic that the incident angle of the image light on the back surface of each of the plurality of half mirrors becomes larger toward the other image light side, and that the amount of image light on the other image light side passing through each of the plurality of half mirrors is reduced; because a part of the image light on the other image light side is reflected on the back surface, and the incident angle adjusting member is an optical member for adjusting the incident angle of the image light on the main surface of the light guide in accordance with the amount of image light on the other image light side reduced due to the reflection characteristic of each of the plurality of the half mirrors to form an image light not satisfying the total reflection condition on the main surface in a part of the image light on the one side image light side that is the other part of the image light, and reducing the amount of image light on the one sided image light side that is totally reflected on the main surface in the light guide to balance the brightness of the displayed image, when a part of the image light on the one-sided image light side that does not satisfy the total reflection condition is transmitted from the main surface to the outside.

In the optical device according to this invention, it is preferable that the incident angle adjusting member is an optical member for adjusting the refractive index of the light guide and the incident angle of the image light on the main surface of the light guide in accordance with the amount of image light on the other side image light side reduced due to the reflection characteristic of each of the plurality of the half mirrors to form an image light not satisfying the total reflection condition on the main surface in a part of the image light on the one side image light side that is the other part of the image light, and reducing the amount of image light on the one sided image light side totally reflected on the main surface in the light guide to balance the brightness of the displayed image, when a part of the image light on the one side image light side that does not satisfy the total reflection condition is transmitted from the main surface to the outside.

In the optical device according to this invention, it is preferable that the incident angle adjusting member is an optical member for making match an angle ratio of an angle of view of the other side image light side to the image light angle and an angle ratio of an angle of view of the one side image light side to the image light angle, and the angle of view of the other side image light side is an angle of view that a part of the image light on the one side image light side reflected on the back surface, and the angle of view of the one side image light side is an angle of view that a part of the image light on the other side image light side is not totally reflected on the main surface.

In the optical device according to this invention, it is preferable that the incident angle adjusting member is an optical member for making match a ratio of an attenuation region from the other end of the display image to a start position where the brightness of the display image is attenuated due to the decrease in the amount of image light on the other side image light side, and a ratio of the attenuation region from one end of the display image to a start position where the brightness of the display image is attenuated due to the decrease in the amount of image light on the one side image light side.

In the optical device according to this invention, it is preferable that the incidence angle of the center image light on the main surface is θ1, a reflection characteristic boundary angle of half mirror is θ2, a half angle of the angle of view of the image light is θ3, and the refractive index of the light guide is N, then, following formulae are satisfied:

$$\{(\theta1+(\tfrac{1}{2})\theta1)+\theta3-\theta2\}\div(2\times\theta3) \tag{1}$$

$$[(2\times\theta3)-\{(\theta1+\theta3)-\arcsin(1/N)\}]\div(2\times\theta3) \tag{2}$$

(1)=(2), that is:

$$(3/2)\theta1+\theta3-\theta2=-\theta1+\theta3+\arcsin(1/N) \tag{3}$$

so that:

$$(5/2)\theta1-\theta2-\arcsin(1/N)=0 \tag{4}$$

wherein, the central image light is image light that passed through the center line of the angle of view of the image light, and that corresponds to the center of the display image; the reflection characteristic boundary angle θ2 is a boundary angle at which a rate at which the image light reflected on the back surface of each of the plurality of half mirrors increases; the formula (1) indicates an angle ratio of the other side image light angle $\{(\theta1+(\tfrac{1}{2})\theta1)+\theta3-\theta2\}$ to the image light angle $(2\times\theta3)$, and the other side image light angle $\{(\theta1+(\tfrac{1}{2})\theta1)+\theta3-\theta2\}$ is an angle of view that a part of image light of the one side image light side to be reflected on the back surface; the formula (2) indicates an angle ratio of the other side image light angle $[(2\times\theta3)-\{(\theta1+\theta3)-\arcsin(1/N))\}]$ to the image light angle $(2\times\theta3)$, and the one side image light angle $[(2\times\theta3)-\{(\theta1+\theta3)-\arcsin(1/N)\}]$ is an angle of view that a part of the image light on the one side image light not to be totally reflected on the main surface; the formula (3) is an equation in which the angle ratio of the formula (1) and the angle ratio of the formula (2) are connected by equality; and the formula (4) is an arrangement of the formula (3).

In the optical device according to this invention, it is preferable that the following formula is satisfied:

$$0.9 \leq ((5/2)\theta1-\theta2)+\arcsin(1/N) \leq 1.1 \tag{5}$$

A wearable image display according to this invention comprises: the optical device according to this invention; an image light output part attached to the optical device to output image light to the optical device, and a wearing part for wearing the optical device and the image light output part on a user's face.

Advantageous Effects of Invention

The optical device and the wearable image display of the present invention can easily balance the brightness of the displayed image.

DESCRIPTION OF EMBODIMENTS

Figure 1:
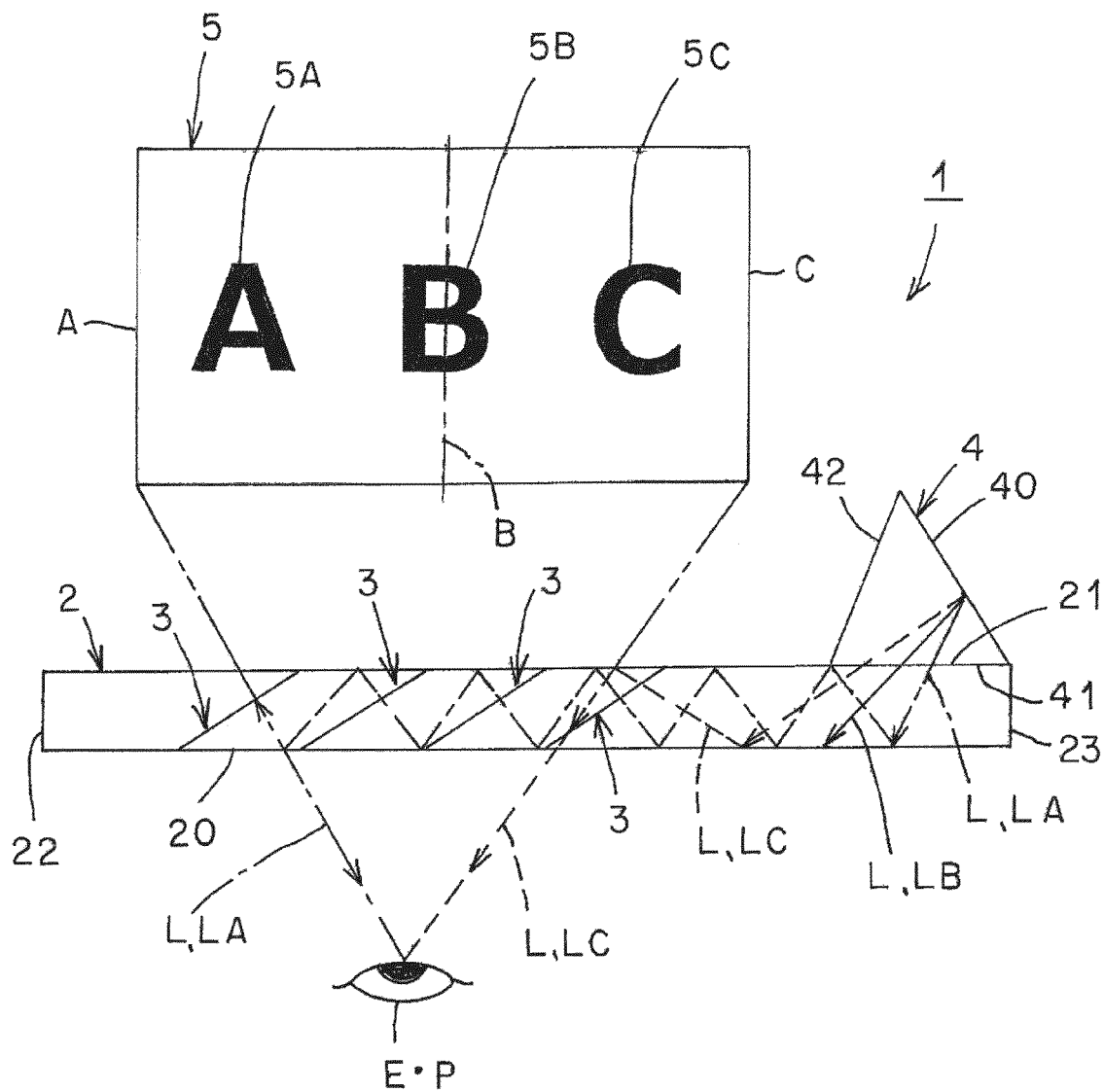
FIG. 1 is a schematic plan explanatory view showing an embodiment of an optical device according to the present invention.

Hereinafter, an embodiment of the optical device and the wearable image display according to the present invention will be described in detail with reference to the attached drawings. In the drawings, hatching for a light guide body and an incident angle adjusting member is omitted.

(Description of Configuration of Optical Device 1)

FIG. 1 to FIG. 13 show an embodiment of the optical device according to the present invention. Hereinafter, the configuration of the optical device according to this embodiment will be described. In the drawings, reference numeral 1 indicates an optical device according to this embodiment. The optical device (module) 1 according to this embodiment is shown as a module arranged sideways.

(Description of Optical Device 1)

As shown in FIG. 1, the optical device 1 includes a light guide plate 2 as a light guide, a plurality of, four in this example, half mirrors 3, and an incident angle adjusting member 4. The optical device 1 makes image light (image ray) L be incident on the human eye E.P as a virtual image to display the virtual image as a display image 5.

(Description of Image Light L and Display Image 5)

Figure 12:
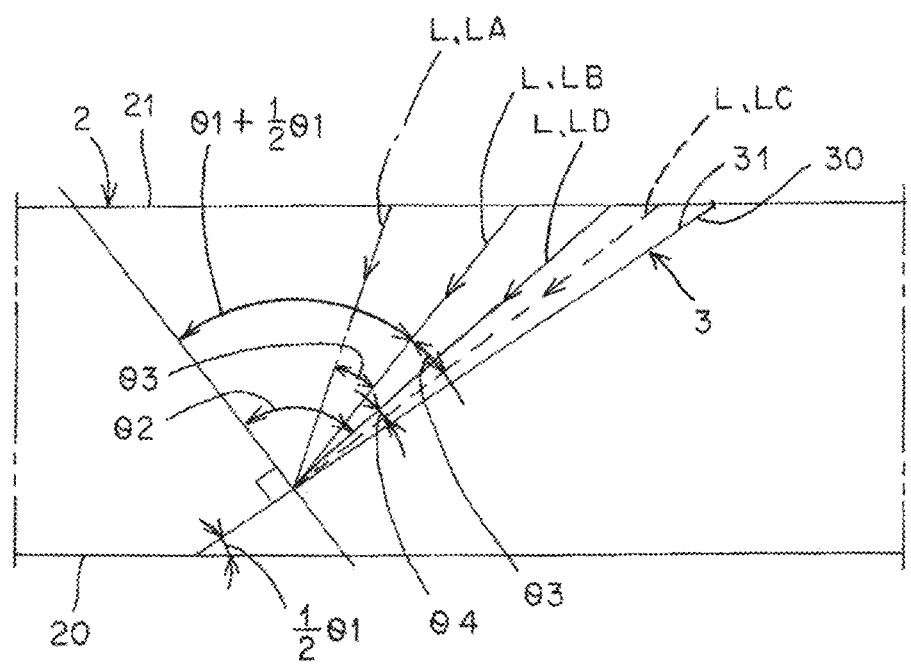
FIG. 12 is an explanatory view showing an angle ratio of an other side image light angle on which a part of the image light is reflected on the back surface of the half mirror, to the angle of view of the image light.
Figure 13:
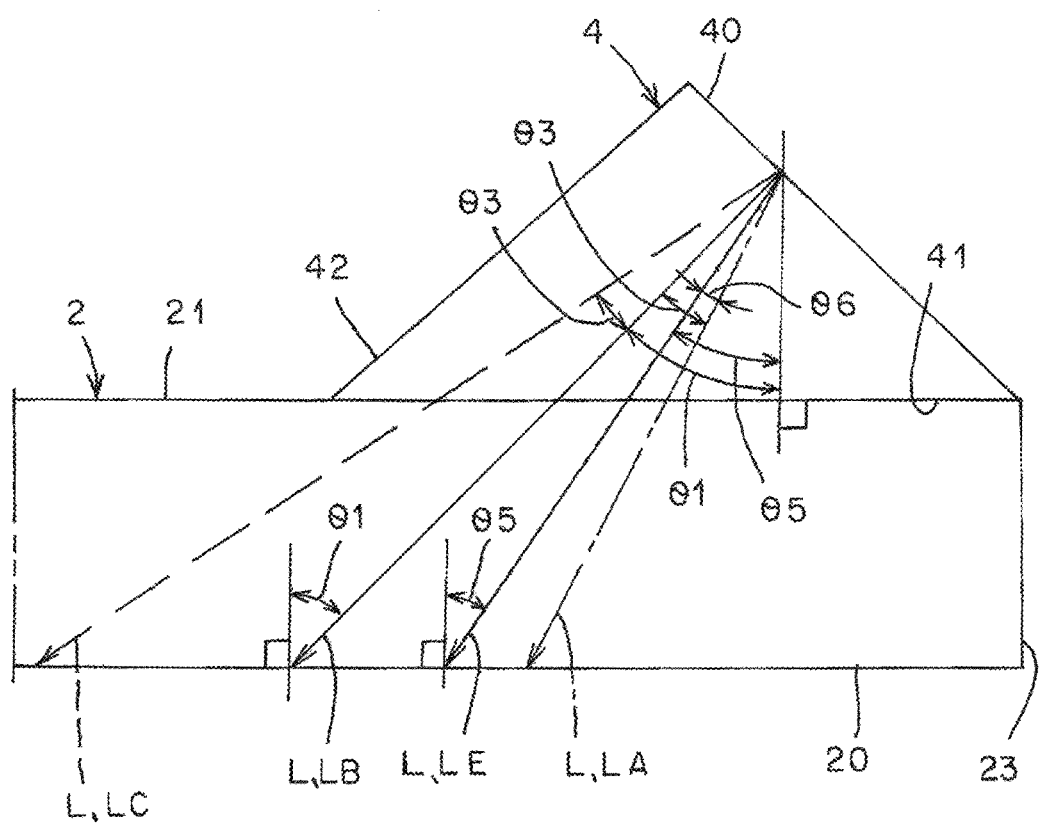
FIG. 13 is an explanatory view showing an angle ratio of the image light angle of the one side image light that is not totally reflected on the main surface of the light guide plate to the angle of view of the image light.

As shown in FIG. 1 to FIG. 4, FIG. 6, FIG. 7, FIG. 12, and FIG. 13, the image light L has an image light angle which corresponds to the angle of view of the display image 5 (see two times θ3 in FIG. 12 and FIG. 13). That is, the image light L has the image light angle of two times θ3 as shown in FIG. 12 and FIG. 13. Here, the image light angle means a transversal angle of view (horizontal angle of view) corresponding to the width (transversal or horizontal) of the display image 5.

One side of the image light, (hereinafter referred as one side image light) LA that passes through a half straight line at one side of the image light angle in the image light L, corresponds to one end of the display image 5 (in this example, the left end A). Center of the image light (hereinafter referred as "center image light") LB that passes through the center line of the image light angle in the image light L, corresponds to the left and right center B of the display image 5 (see an alternate long and short dash line). Further, the other side of the image light (hereinafter referred as "other side image light") LC, that passes through a half straight line at the other side of the image light angle in the image light L, corresponds to the other end of the display image 5 (in this example, the right end C). In this way, the image light L (LA, LB, LC) is displayed as the virtual image incident on the human eye E.P as the display image 5 (5A, 5B, 5C) as shown in FIG. 1.

In FIG. 1 to FIG. 4, FIG. 6, FIG. 7, FIG. 12, and FIG. 13, the alternate long and short dash line arrow indicates one side image light LA, the solid line arrow indicates the center image light LB, and the broken line arrow indicates the other side image light LC. In FIG. 1, the enlarged character "A" indicates left image 5A displayed in the left end A side portion of the display image 5, the enlarged character "B" indicates center image 5B displayed at center B portion of the display image 5, and the enlarged character "C" indicates right image 5C displayed in right end C side portion of the display image 5.

(Description of Light Guide Plate 2)

The light guide plate 2 is made of, in this example, colorless transparent resin material such as acrylic resin, PC (polycarbonate), PMMA (polymethyl methacrylate, methacrylic resin), or colorless transparent glass. As shown in FIG. 1 to FIG. 4, FIG. 6, FIG. 7, FIG. 12, and FIG. 13, the light guide plate 2 has a plate shape (flat plate shape, rectangular parallelepiped shape, etc.) in this example, and has two main surfaces (that is, a front surface 20 facing the human eye E.P side and a back surface 21 opposite to the human eye E.P), and four auxiliary surfaces (that is, an upper surface, a lower surface, a left end surface 22 and a right end surface 23). The refractive index of the light guide plate 2 is N.

The light guide plate 2 is an optical member that leads the image light L incident into the light guide plate 2 through the incident angle adjusting member 4 from one portion (in this example, the right end surface 23 side) to the other portion (in this example, the left end surface 22 side) by the light guide nature of the two main surfaces 20 and 21.

Figure 2:
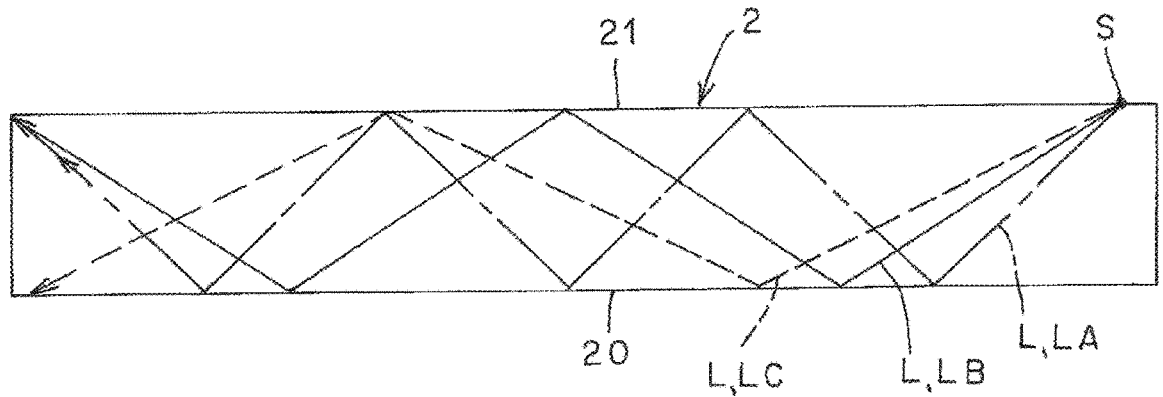
FIG. 2 is an explanatory view showing a state in which image light having an angle of image light (angle of view corresponding to a display image) travels in the light guide plate.

The image light L (LA, LB and LC) has an image light angle as described above. As a result, as shown in FIG. 2, the one side image light LA, the center image light LB, and the other image light LC of the image light L totally reflect at different angles from each other on the two main surfaces 20 and 21 of the light guide plate 2. Herein, the incident angle and the reflection angle on the main surfaces 20 and 21 of the one side image light LA are smaller than the incident angle $\theta 1$ (see FIG. 13) on the main surfaces 20 and 21 of the center image light LB. The incident angle $\theta 1$ will be simply referred to as "the incident angle of the center image light LB." The incident angle and the reflection angle on the main surfaces 20 and 21 of the other side image light LC are larger than the incident angle $\theta 1$ and the reflection angle of the center image light LB.

Figure 3:
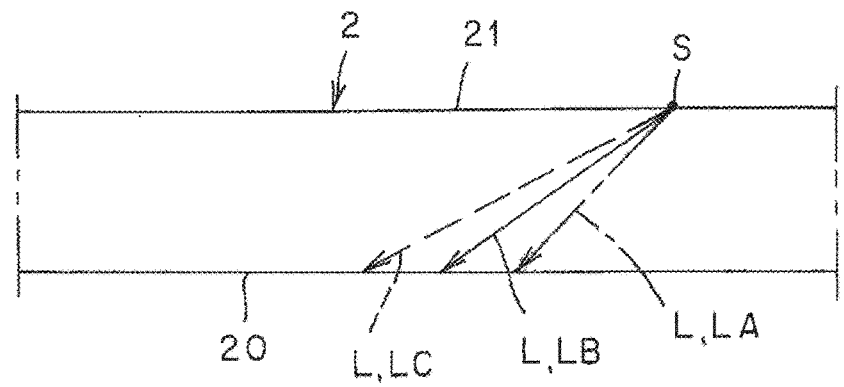
FIG. 3 is an explanatory view showing a state in which the image light diverges and advances based on the image light angle with respect to the start point.
Figure 4:
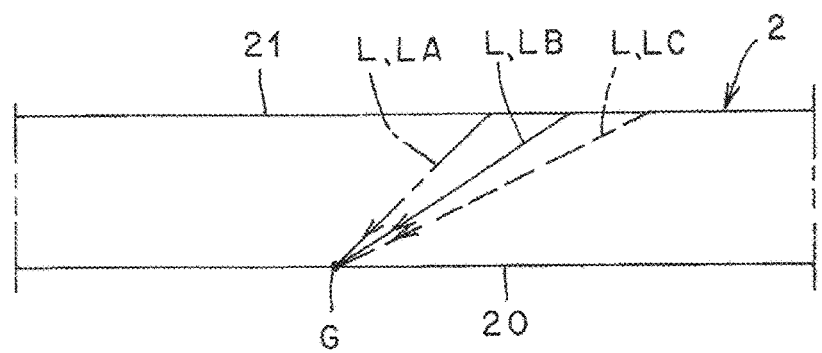
FIG. 4 is an explanatory view showing a state in which the image light converges and advances based on the image light angle with respect to the end point.

As shown in FIG. 3, the one side image light LA, the center image light LB, and the other side image light LC of the image light L diverge based on the image light angle when a start point S is used as a reference. On the other hand, as shown in FIG. 4, the one side image light LA, the center image light LB, and the other image light LC of the image light L converge based on the image light angle when a start point G is used as a reference. FIG. 3 and FIG. 4 are explanatory diagrams based on the start point S and the end point G so that they can be easily explained when describing the optical paths of the image light L, including LA, LB and LC (strait forwarding, reflecting, transmitting, or else).

(Description of Half Mirrors 3)

As shown in FIG. 1, FIG. 5 to FIG. 7, and FIG. 12, the plurality of, four in this example, the plurality of half mirrors 3 is arranged in the light guide plate 2 in a state of being parallel to each other and inclined. In the inclined state of each of the plurality the half mirrors 3, one end of each of the plurality of the half mirrors 3 is located on the left end surface 22 side of the light guide plate 2, and the other end of each of the plurality of the half mirrors 3 is located on the right end surface 23 side of the light guide plate 2. The one end is an end at the surface 20 side of the light guide plate 2. The other end is an end at the back surface 21 side the light guide plate 2. The inclination angle of each of the half mirrors 3 with respect to the main surfaces 20 and 21 of the light guide plate 2 are half of the incident angle $\theta 1$ of the center image light LB (see FIG. 12).

Each of the plurality (four) of half mirrors 3 is an optical member that display a virtual image as a display image by making the image light L to enter into a human eye E.P as the virtual image after making the image light L traveling through the light guide plate 2 by the light guide nature of the light guide plate 2 to emit outside.

Each of the plurality (four) of half mirrors 3 is formed by dielectric layers films stacked. A surface of half mirror 3 on the human eye E.P side is referred as a front surface 30, and a surface of the half mirror 3 opposite to the human eye E.P is referred as a back surface 31. The half mirror 3 reflects the image light L on the front surface 30 and the back surface 31 with the reflection characteristics shown in FIG. 5.

(Description of Reflection Characteristics of Half Mirror 3)

The half mirror 3 is an optical member having a reflection characteristic in which a part of the image light L is reflected on the back surface 31. As shown in FIG. 12, the "part of the image light L" is a part LC–LD of the image light L on the other side image light LC side between the other side image light LC. Hereinafter, "the part of the image light L on the other side image light LC side" will be simply referred to as "the part of the image light L." As shown in FIG. 12, an image light LD is the image light L in which an incident angle on the back surface 31 of the half mirror 3 is an reflection characteristic boundary angle (limit angle) $\theta 2$.

Figure 5:
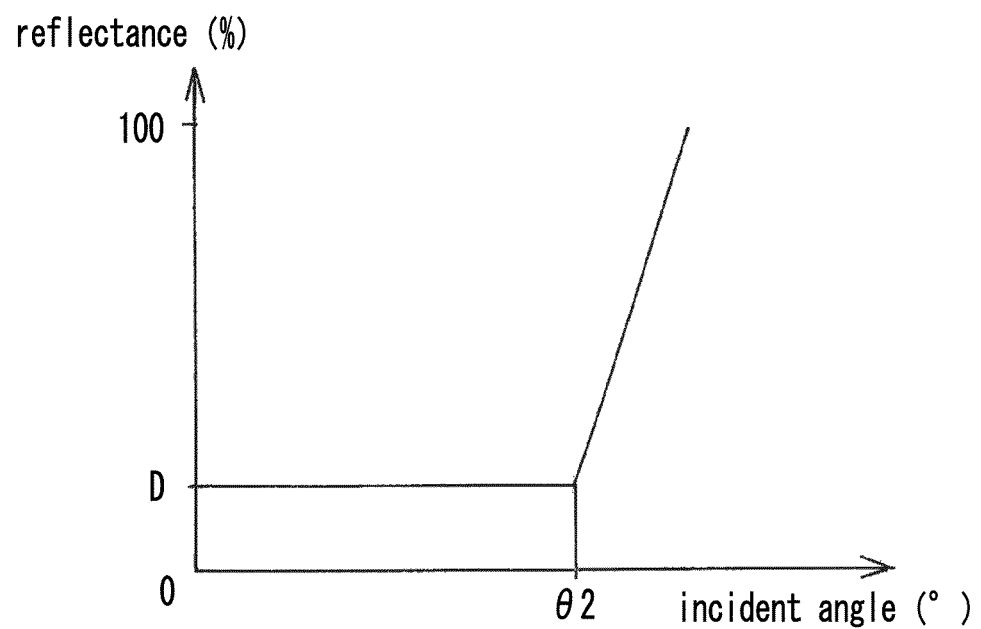
FIG. 5 is an explanatory diagram showing the reflection characteristics of a half mirror.
Figure 6:
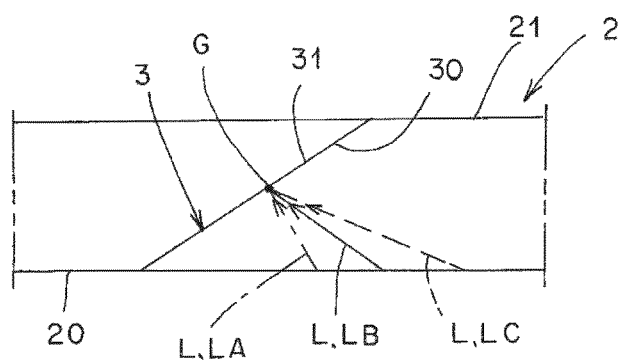
FIG. 6 is an explanatory view showing a state in which the image light is incident on the surface of the half mirror, and showing the surface reflection of the half mirror.
Figure 7:
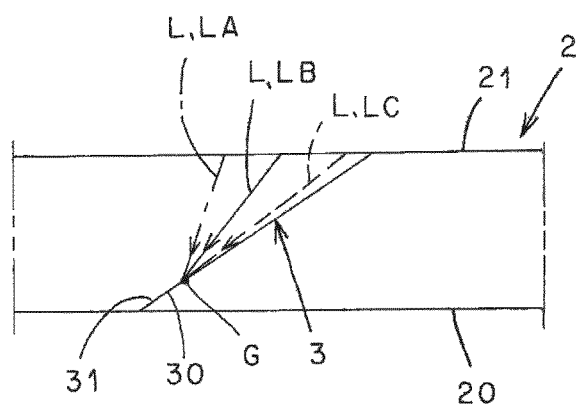
FIG. 7 is an explanatory view showing a state in which the image light is incident on the back surface of the half mirror, and showing the back surface reflection of the half mirror.
Figure 8:
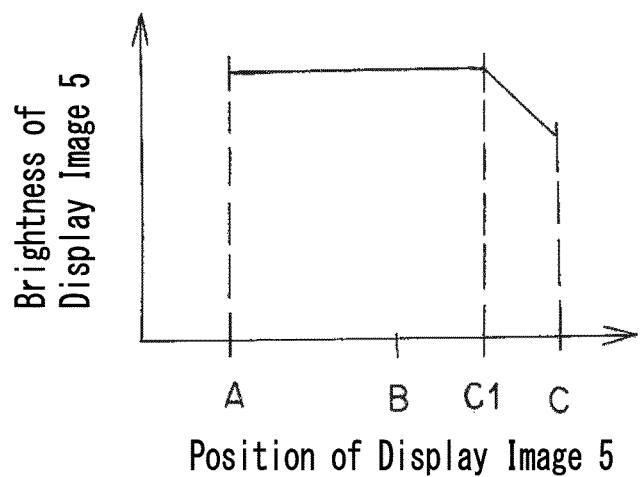
FIG. 8 is an explanatory diagram showing the relative relationship between the brightness of the display image and the position of the display image, in which the brightness of the right end side portion of the display image is attenuated due to the reflection characteristics of the half mirror.

Hereinafter, the reflection characteristics of the half mirror 3 will be described with reference to FIG. 5 to FIG. 8 and FIG. 12. In FIG. 5, the vertical axis indicates the rate at which the image light L is reflected on the front surface 30 and the back surface 31 of the half mirror 3, that is, the reflectance, the unit thereof is percent. The horizontal axis indicates the angle at which the image light L is incident on the front surface 30 and the back surface 31 of the half mirror 3, that is, the incident angle, and the unit thereof is degree. FIG. 6 is an explanatory view showing a state in which the image light L (LA, LB, LC) is incident on the surface 30 of the half mirror 3, for explaining the surface reflection of the half mirror 3. FIG. 7 is an explanatory view showing a state in which the image light L (LA, LB, LC) is incident on the back surface 31 of the half mirror 3, for explaining the back surface reflection of the half mirror 3. FIG. 8 is an explanatory diagram showing the relative relationship between the brightness of the display image 5 in the vertical axis and the position of the display image 5 in the horizontal axis, for explaining a state in which the brightness of the part on the right end C side of the display image 5 is attenuated in accordance with the reflection characteristics of the half mirror 3. FIG. 12 is an explanatory view showing the angle ratio between other side image light angle $\theta 4$ and the image light angle. The other side image light angle $\theta 4$ is angle at which the part LC–LD of the image light L reflects on the back surface 31 of the half mirror 3.

As shown in FIG. 5, in the range where the incident angle of the image light L is from zero to the reflection characteristic boundary angle $\theta 2$ of the half mirror 3, the reflectance of the image light L is constant at a target value D. When the incident angle of the image light L exceeds the reflection characteristic boundary angle $\theta 2$, the reflectance of the image light L exceeds the target value D and increases. In this example, the reflection characteristic boundary angle $\theta 2$ is an arbitrary angle from about 80 degrees to about 84 degrees. The target value D is about 20 percent in this example.

Here, as shown in FIG. 6, when the image light L (LA, LB, LC) totally reflected by the main surface 20 on the surface side of the light guide plate 2 is incident on the surface 30 of the half mirror 3, the incident angle is equal or smaller than the reflection characteristic boundary angle $\theta 2$ (for example, about 80 degrees). As a result, the image light L (LA, LB, LC) is uniformly reflected with the reflectance of the target value D (about 20 percent).

On the other hand, as shown in FIG. 7, when the image light L (LA, LB, LC) totally reflected by the main surface 21 on the back surface side of the light guide plate 2 is incident on the back surface 31 of the half mirror 3, the incident angle becomes larger toward the other image light LC side. If the incident angle on the other side image light LC side exceeds the reflection characteristic boundary angle $\theta 2$ (for example, about 80 degrees), the part LC–LD of the image light L whose incident angle exceeds the reflection characteristic boundary angle $\theta 2$ reflects on the back surface 31 of the half mirror 3 with a reflectance larger than the reflectance of the target value D (about 20 percent).

As a result, the amount of light of the image light L on the other side image light LC side of the image light L transmitted from the back surface 31 to the surface 30 of the half mirror 3 decreases. As a result, as shown in FIG. 8, brightness of a portion C–C1 on the right end C side of the display image 5 corresponding to the image light L on the other side of the image light LC is attenuated (decreased). That is, the portion C–C1 on the right end C side of the display image 5 becomes dark. This is the reflection characteristic of the half mirror 3 described above. The details of the portion C–C1 on the right end C side of the display image 5 will be described later.

(Description of Incident Angle Adjusting Member 4)

As shown in FIG. 1 and FIG. 13, the incident angle adjusting member 4 is composed of a triangular prism in this example, and has a triangular prism shape or triangular plate shape. The incident angle adjusting member 4 has an incident surface 40, a joint surface 41, a side surface 42, and upper and lower end surfaces. The joint surface 41 of the incident angle adjusting member 4 is joined to the main surface (the back surface 21) of the light guide plate 2, and the incident angle adjusting member 4 and the light guide plate 2 are formed in an integral structure. The right corner of the incident angle adjusting member 4 (that is, the corner formed between the incident surface 40 and the joint surface 41) and the right end surface 23 of the light guide plate 2 coincide with each other, and although not shown, the upper and lower end surfaces of the incident angle adjusting member 4 and the upper and lower end surfaces of the light guide plate 2 are respectively flush with each other. The refractive index of the incident angle adjusting member 4 is N, which is the same as the refractive index of the light guide plate 2.

As shown in FIGS. 1 and 13, the image light L is incident on the incident angle adjusting member 4 at the incident surface 40 of the incident angle adjusting member 4, passes through the joint surface 41 of the incident angle adjusting member 4 and the main surface 21 (back surface 21) of the light guide plate 2 and enters into the light guide plate 2. At this time, the center image light LB of the image light L is incident on the incident angle adjusting member 4 perpendicularly to the incident surface 40 of the incident angle adjusting member 4.

The incident angle adjusting member 4 is an optical member which balances the brightness (in this example, the left and right brightness, of the display image 5) by adjusting the incident angle of the image light L (the total reflection condition of the image light L) on the main surfaces 20 and 21 of the light guide plate 2 in accordance with the reflection characteristics of the half mirror 3 to form an image light within other part of the image light L that does not satisfy the total reflection conditions on the main surfaces 20 and 21. Here, said other part of the image light L is, as shown in FIG. 13, a part LA-LE of the image light L within the one side image light LA, hereinafter, simply referred to as "an other part of the image light", that is, the image light L between the one side image light LA and the image light LE. As shown in FIG. 13, the image light LE is an image light of which the incident angle on the main surfaces 20 and 21 of the light guide plate 2 is the critical angle θ5 (=arcsin (1/N)).

As described above, the image light L has the image light angle (see FIGS. 1 and 13). As a result, as shown in FIG. 1 to FIG. 4 and FIG. 13, regarding incident angles of the image light L (LA, LB, LC) on the main surfaces 20 and 21 of the light guide plate 2, the incident angle of the one side image light LA side is smaller than the incident angle θ1 of the center image light LB and that of the other side image light LC side.

Figure 9:
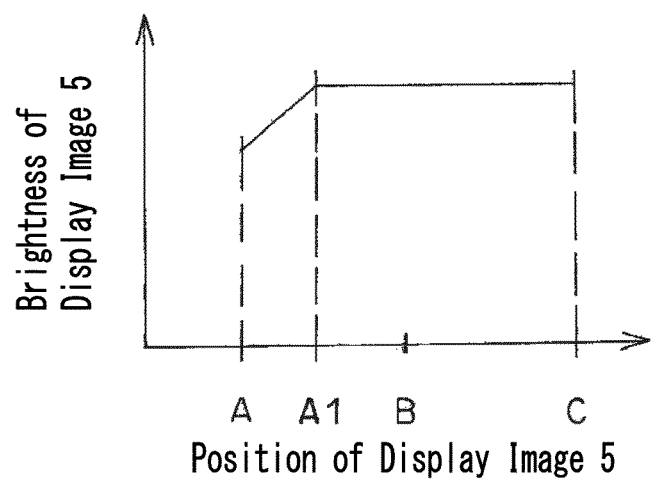
FIG. 9 is an explanatory diagram showing the relative relationship between the brightness of the displayed image and the position of the displayed image, and the brightness of the left end side portion of the displayed image is attenuated by adjusting the incident angle of the incident angle adjusting member.

Therefore, by adjusting the incident angle of the image light L on the main surfaces 20 and 21 of the light guide plate 2 by means of the incident angle adjusting member 4, the other part LA-LE of the image light L is formed as an image light that does not satisfy the total reflection condition on the main surfaces 20 and 21. That is, the other part LA-LE of the image light L is transmitted to the outside from the main surfaces 20 and 21 without being totally reflected on the main surfaces 20 and 21. As a result, since the image light L on the one side image light LA side totally reflects on the main surfaces 20 and 21 of the light guide plate 2, the amount of light of the image light L on the one side image light LA side is reduced. Therefore, as shown in FIG. 9, the brightness of the portion A–A1 on the left end A side of the display image 5 corresponding to the image light L on the one side image light LA side is attenuated or decreased. That is, the portion A–A1 on the left end A side of the display image 5 becomes dark. The details of the left end A side portion A–A1 of the display image 5 will be described later together with the details of the right end C side portion C–C1 of the display image 5 described above.

Figure 10:
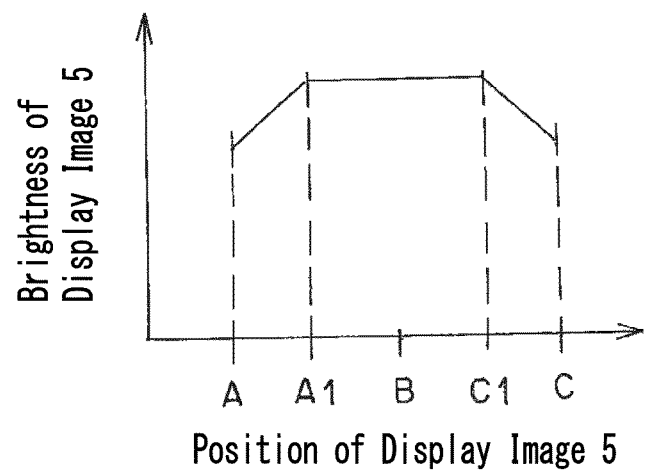
FIG. 10 is an explanatory diagram showing the relative relationship between the brightness of the display image and the position of the display image, and the brightness of the right end side portion of the display image and the brightness of the left end side portion of the display image are combined.

In this way, the incident angle adjusting member 4 that adjust the incident angle of the image light L in accordance with the reflection characteristics of the half mirror 3 to form an image light within the other part of the image light L that does not satisfy the total reflection conditions on the main surfaces 20 and 21, to balance the brightness of the display image 5. That is, the incident angle adjusting member 4 that adjust the incident angle of the image light L in accordance with the amount of image light L of the other side image light LC side, which is reduced due to the reflection characteristics of the half mirror 3, to reduce the amount of light of the image light L of the one side image light LA side, to balance the brightness of the display image 5. As a result, as shown in FIG. 10, the brightness of the right end C side portion C–C1 of the display image 5 becomes to match with the brightness of the left end A side portion A–A1 of the display image 5.

(Description of Balancing of Left and Right Brightness of Display Image 5)

Hereinafter, it will be described how to balance the left and right brightness of the display image 5 with reference to FIGS. 8 to 13.

FIG. 8 to FIG. 11 are explanatory diagrams showing the relative relationship between the brightness of the display image 5 and the position of the display image 5 in the left-right direction. In FIGS. 8 to 11, the vertical axis indicates the brightness of the display image 5 brighter toward the upper side. The horizontal axis indicates the position of the display image 5 in the left-right direction. On the horizontal axis, "A" indicates the left end of the display image 5, and "A1", "A2", and "A3" indicate the start positions where the brightness of the display image 5 is attenuated due to the decrease in the amount of image light L on the one side image light LA side. "B" indicates the center of the display image 5, "C" indicates the right end of the display image 5, and "C1" indicates a start position where the brightness of the display image 5 is attenuated due to a decrease in the amount of image light L on the other side image light LC side. "A–C" indicates the width of the display image 5.

Figure 11:
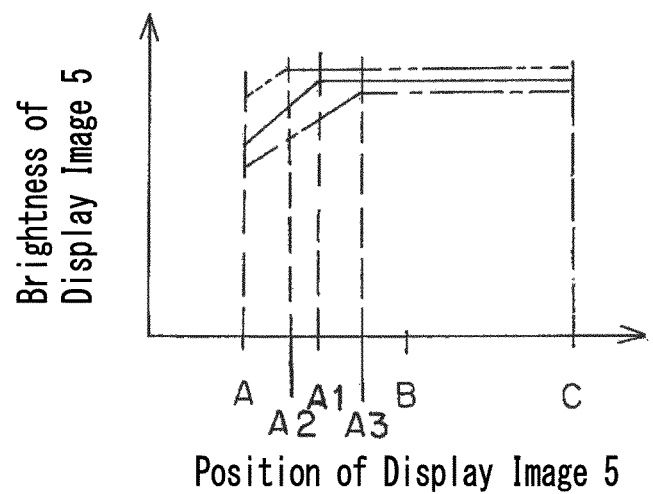
FIG. 11 is an explanatory diagram showing the relative relationship between the brightness of the display image and the position of the display image, and showing a state in which there is a variation at the start position where the brightness of the display image is attenuated depending on the incident angle of the image light.

FIG. 8 is an explanatory diagram showing a state where the brightness of the portion C–C1 on the right end C side of the display image 5 is attenuated due to the reflection characteristic of the half mirror 3. FIG. 9 is an explanatory diagram showing a state where the incident angle adjusting member 4 adjusts the incident angle of the image light L on the main surfaces 20 and 21 of the light guide plate 2 in accordance with the reflection characteristics of the half mirror 3, so that the brightness of the portion A–A1 is attenuated. FIG. 10 is an explanatory view showing a state where the brightness of the portion C–C1 on the right end C side of the display image 5 and the brightness of the portion A–A1 on the left end A side of the display image 5 are combined. FIG. 11 is an explanatory view showing a state where the brightness of the displayed image 5 varies depending on the incident angle of the image light L on the main surfaces 20 and 21 of the light guide plate 2, that is, the attenuation start position A1, A2, or A3.

FIG. 12 is an explanatory view showing, as described, the angle ratio between the other side image light angle θ4 at which the part LC–LD of the image light L reflects on the back surface 31 of the half mirror 3 and the image light angle (2 times θ3). FIG. 13 is an explanatory view showing the angle ration between the one side image light angle θ6 at which the other part LA-LE of the image light L is not totally reflected on the main surface 20 of the light guide plate 2 the image light angle (2 times θ3).

First, as shown in FIG. 8, the brightness of the portion C–C1 on the right end C side of the display image 5 is attenuated in accordance with the reflection characteristic of the half mirror 3. That is, the portion C–C1 on the right end C side of the display image 5 becomes dark.

Therefore, as shown in FIG. 9, by adjusting the incident angle of the image light L by the incident angle adjusting member 4, the brightness of the portion A–A1 on the left end A side of the display image 5 is attenuated in accordance with the reflection characteristics of the half mirror 3. That is, the portion A–A1 on the left end A side of the display image 5 is darkened.

As a result, as shown in FIG. 10, it can be made the brightness of the portion C–C1 on the right end C side of the display image 5 match the brightness of the portion A–A1 on the left end A side of the display image 5.

Here, as shown in FIG. 11, on the incident angle adjustment of the image light L by the incident angle adjusting member 4, the brightness attenuation start positions (A1, A2, A3) of the display image 5 vary due to the variation of the incident angle of the image light L on the main surfaces 20 and 21 of the light guide plate 2.

Therefore, the incident angle adjusting member 4 matches a ratio (C–C1)/(A–C) and a ratio (A–A1)/(A–C):

the ratio (C–C1)/(A–C) is the ratio of the attenuation region C–C1 to the width A–C of the display image 5, and the attenuation region C–C1 is an region from the right end C of the display image 5 to the start position C1 where the brightness of the display image 5 is attenuated due to a decrease in the amount of image light L on the other side image light LC side, shown in FIG. 8 and FIG. 10:

and the ratio (A–A1)/(A–C) is the ratio of the attenuation region A–A1 to the width A–C of the display image 5, and the attenuation region A–A1 is an region from the left end A of the display image 5 to the start position A1 where the brightness of the display image 5 is attenuated due to a decrease in the amount of image light L on the one side image light LA side, shown in FIG. 9 and FIG. 10. As a result, the following formula (6) is obtained.

$$(C-C1)/(A-C)=(A-A1)/(A-C) \qquad (6)$$

Here, the widths A–C of the display images 5 shown in FIG. 8 to FIG. 10 corresponds to the image light angle (2 times θ3) shown in FIG. 12 and FIG. 13. Further, the attenuation region C–C1 shown in FIG. 8 and FIG. 10 corresponds to the other image light side angle θ4 shown in FIG. 12. Further, the attenuation region A–A1 shown in FIG. 9 and FIG. 10 corresponds to the one side image light angle θ6 shown in FIG. 13.

As a result, as shown in the following formula (7), the ratio (C–C1)/(A–C) of the attenuation region C–C1 to the width A–C of the display image 5 corresponds to the angle ratio {θ4÷(2×θ3)} between the other side image light angle θ4 and the image light angle (2 times θ3). Further, as shown in the following formula (8), the ratio (A–A1)/(A–C) of the attenuation region A–A1 to the width A–C of the display image 5 corresponds to the angle ratio {θ6÷(2×θ3)} of the one side image light angle θ6 to the image light angle (2 times θ3).

$$(C-C1)/(A-C)=\theta 4 \div (2 \times \theta 3) \qquad (7)$$

$$(A-A1)/(A-C)=\theta 6 \div (2 \times \theta 3) \qquad (8)$$

That is, for the incident angle adjusting member 4, matching of the ratio (C–C1)/(A–C) of the attenuation region C–C1 to the width A–C of the display image 5 and the ratio (A–A1)/(A–C) of the attenuation region A–A1 to the width A–C of the display image 5 is equivalent to matching of the angle ratio {θ4÷(2×θ3)} of the other side image light angle θ4 shown in FIG. 12 to the image light angle (2 times θ3) and the angle ratio {θ6÷(2×θ3)} of the one side image light angle θ6 shown in FIG. 13 to the image light angle (2 times θ3). As a result, the following formula (9) is obtained.

$$\theta 4 \div (2 \times \theta 3)=\theta 6 \div (2 \times \theta 3) \qquad (9)$$

The other side image light angle θ4 shown in FIG. 12 is obtained as shown in the following formula (10).

$$\theta 4=(\theta 1+(½)\theta 1)+\theta 3-\theta 2 \qquad (10)$$

That is, the other side image light angle θ4 is, as shown in FIG. 12, an angle derived from the incident angle (θ1+(½)θ1) on the back surface 31 of the half mirror 3 of the center image light LB, adding the half angle θ3 of the image light angle, and subtracting the incident angle on the back surface 31 of the half mirror 3 of the image light LD, that is, the reflection characteristic boundary angle θ2 of the half mirror 3.

As a result, by substituting (θ1+(½)θ1)+θ3−θ2 in the right side of the above formula (10) for θ4 in the right side of the above formula (7), the following formula (1) is obtained. The following formula (1) shows an angle ratio of the other side image light angle {(θ1+(½)θ1)+θ3−θ2} to image light angle of view (2 times θ3), where the other side image light angle {(θ1+(½)θ1)+θ3−θ2} is an angle of view that a part LC-LD of the image light L reflects on the back surface 31 of the half mirror 3 to.

$$\{(\theta 1+(½)\theta 1)+\theta 3-\theta 2\} \div (2 \times \theta 3) \qquad (1)$$

On the other hand, the one side image light angle θ6 shown in FIG. 13 is obtained as shown in the following formula (11).

$$\theta 6=(2 \times \theta 3)-\{(\theta 1+\theta 3)-\arcsin(1/N)\} \qquad (11)$$

That is, the one side image light angle θ6 is obtained as shown in FIG. 13 by adding the half angle θ3 of the image light angle to the incident angle θ1 on the main surface 20 of the light guide plate 2 of the center image light LB, subtracting the incident angle on the main surface 20 of the light guide plate 2, that is, the critical angle arcsin (1/N) on the main surface 20 of the light guide plate 2 of the image light LE, and subtracting it from the image light angle (2 times θ3).

As a result, when $(2×θ3)-\{(θ1+θ3)-\arcsin(1/N)\}$ on the right side of the above formula (11) is substituted into θ6 on the right side of the above formula (8), the following formula (2) is obtained. The following formula (2) shows an angle ratio of the one side image angle $[(2×θ3)-\{(θ1+θ3)-\arcsin(1/N)\}]$ where the other part LA-LE of the image light L is not totally reflected on the main surfaces 20 and 21 of the light guide plate 2 to the image light angle (2times θ3).

$$[(2×θ3)-\{(θ1+θ3)-\arcsin(1/N)\}]÷(2×θ3) \quad (2)$$

From the above formula (9), the formula (1) and the formula (2) are connected by equality as shown in the following formula (3), and further arranged as shown in the following formula (4).

$$(1)=(2)$$

that is:

$$(3/2)θ1+θ3-θ2=-θ1+θ3+\arcsin(1/N) \quad (3)$$

then, $$(5/2)θ1-θ2-\arcsin(1/N)=0 \quad (4)$$

In the above formula (4), the incident angle θ1 on the main surfaces 20 and 21 of the light guide plate 2 of the center image light LB and the reflection characteristic boundary angle θ2 of the half mirror 3 are substituted by concrete values of θ1=49.3 and θ2=82. Then, the following formula (12) is obtained. From the following formula (12), the refractive index N of the light guide plate 2 and the incident angle adjusting member 4 can be obtained.

$$(5/2)49.3-82=41.25=\arcsin(1/N) \quad (12)$$

Here, the permissible range of the ratio (A-A1)/(A-C) of the attenuation region A-A1 to the width A-C of the display image 5 against the ratio (C-C1)/(A-C) of the attenuation region C-C1 to the width A-C of the display image 5 is, for example, about 20% or less, preferably about 10 percent or less. That is, the optical device 1 preferably satisfies the following formula (5). In the following formula (5), the numerical values "0.9" and "1.1" are the numerical values obtained by the evaluation test described later. That is, these numerical values "0.9" and "1.1" are not to give the user a sense of discomfort when looking at the displayed image 5, since the left and right brightness of the display image 5 are balanced when the display image 5 is viewed by the human eye E.P on the optical device 1.

$$0.9 ≤ ((5/2)θ1-θ2)÷\arcsin(1/N) ≤ 1.1 \quad (5)$$

(Description of Operation of the Embodiment)

The optical device 1 according to this embodiment having the above configuration will be described below in its operation.

As shown in FIG. 1 and FIG. 13, the image light L having an angle corresponding to the display image 5 is incident on the incident angle adjusting member 4 from the incident surface 40 of the incident angle adjusting member 4 to enter the light guide plate 2 through the joint surface 41 of the incident angle adjusting member 4 and the main surface 21 (back surface 21) of the light guide plate 2. At this time, the center image light LB of the image light L is incident on the incident angle adjusting member 4 perpendicularly to the incident surface 40 of the incident angle adjusting member 4. Further, since the refractive index N of the incident angle adjusting member 4 and that of the light guide plate 2 are the same, the image light L goes straight without refracting through the joint surface 41 of the incident angle adjusting member 4 and the main surface 21 (the back surface 21) of the light guide plate 2.

The image light L incident on the light guide plate 2 is guided or passes from a portion of the right end surface 23 side where is one side portion of the light guide plate 2 to a portion of the left end side surface 22 side where the other side portion of the light guide plate 2 by the light guide nature of the two main surfaces 20 and 21 of the light guide plate 2. At this time, the image light L is reflected or transmitted on the front surface 30 and the back surface 31 of the four half mirrors 3 arranged in the light guide plate 2, and is emitted to the outside from the front surface 20 of the light guide plate 2. The image light L emitted to the outside is incident on the human eye E.P as a virtual image, and this virtual image is displayed as the display image 5.

Description of Effect of Embodiment

The optical device 1 according to this embodiment having the above configuration and operating as above will is described below in its effects.

The optical device 1 according to this embodiment includes the incident angle adjusting member 4 which is an optical member that adjust the incident angle of the image light L on the main surfaces 20 and 21 of the light guide plate 2 in accordance with the reflection characteristics of the half mirror 3, to form an image light that does not satisfy the total reflection conditions on the main surfaces 20 and 21 in the other part LA-LE of the image light. As a result, the optical device 1 according to this embodiment can easily balance the brightness of the display image 5 (in this example, the brightness on the left and right of the display image 5) by means of the incident angle adjusting member 4. Moreover, since the optical device 1 according to this embodiment can balance the brightness of the display image 5, the user does not feel uncomfortable when looking at the display image 5.

The optical device 1 according to this embodiment is to adjust the refractive index N of the light guide plate 2 and the incident angle of the image light L on the main surfaces 20 and 21 of the light guide plate 2 by means of the incident angle adjusting member 4 to form an image light that does not satisfy the total reflection conditions on the main surfaces 20 and 21 of the light guide plate 2 in the other part LA-LE of the image light. As a result, the optical device 1 according to this embodiment can easily balance the left and right brightness of the display image 5 by the incident angle adjusting member 4, and can be provided at low cost.

The optical device 1 according to this embodiment is to adjust, in the image light having an angle of view corresponding to the display 5, the incident angle of the image light on the main surfaces 20 and 21 of the light guide plate 2 by the incident angle adjusting member 4, in accordance with the amount of light of the image light L in the other side image light LC side reduced due to the reflection characteristics of the half mirror 3 so that the amount of light of the image light of the one side image light LA side is reduced.

As a result, the optical device 1 according to this embodiment can easily balance the left and right brightness of the display image 5.

The optical device 1 according to this embodiment is to adjust the refractive index N of the light guide plate 2 and the incident angle of the image light L on the main surfaces 20 and 21 of the light guide plate 2 by the incident angle adjusting member 4, so that the amount of image light of the one side image light LA side is adjusted to that of the image light L of the other side image light LC side. As a result, the optical device 1 according to this embodiment can easily balance the left and right brightness of the display image 5 by the incident angle adjusting member 4, and can be provided at low cost.

The optical device 1 according to this embodiment is to match the angle ratio $\{\theta 4 \div (2 \times \theta 3)\}$ of the other image light side angle $\theta 4$ to the image light angle $(2 \times \theta 3)$ and the angle ratio $\{\theta 6 \div (2 \times \theta 3)\}$ of the one side image light angle $\theta 6$ to the image light angle $(2 \times \theta 3)$. As a result, the optical device 1 according to this embodiment can easily balance the left and right brightness of the display image 5 in adjusting the incident angle of the image light L of the incident angle adjusting member 4, even if there are variations in the brightness attenuation start positions (A1, A2, and A3) of the display image 5 due to variations in the incident angles of the image light L on the main surfaces 20 and 21 of the light guide plate 2.

The optical device 1 according to this embodiment is to match the ratio (C–C1)/(A–C) of the attenuation region C–C1 to the width A–C of the display image 5 and the ratio (A–A1)/(A–C) of the attenuation region A–A1 to the width A–C of the display image 5. As a result, the optical device 1 according to this embodiment can easily balance the left and right brightness of the display image 5 in adjusting the incident angle of the image light L of the incident angle adjusting member 4, even if there are variations in the brightness attenuation start positions (A1, A2, and A3) of the display image 5 due to variations in the incident angles of the image light L on the main surfaces 20 and 21 of the light guide plate 2.

The optical device 1 according to this embodiment is to set the tolerance of the angle ratio $\{\theta 6 \div (2 \times \theta 3)\}$ of the one side image light angle $\theta 6$ to the image light angle of view $(2 \times \theta 3)$, with respect to the angle ratio $\{\theta 4 \div (2 \times \theta 3)\}$ of the other side image light angle $\theta 4$ to the image light angle $(2 \times \theta 3)$, to about 20 percent or less, preferably about 10 percent or less. As a result, the optical device 1 according to this embodiment can balance the left and right brightness of the display image 5 when the display image 5 is viewed by the human eye E.P so that the user does not feel uncomfortable when looking at the display image 5.

The optical device 1 according to this embodiment is to set the tolerance of the ratio (A–A1)/(A–C) of the attenuation region A–A1 to the width A–C of the display image 5, with respect to the ratio (C–C1)/(A–C) of the attenuation region C–C1 to the width A–C of the display image 5, to about 20% or less, preferably about 10% or less. As a result, the optical device 1 according to this embodiment can balance the left and right brightness of the display image 5 when the display image 5 is viewed by the human eye E.P so that the user does not feel uncomfortable when looking at the display image 5.

(Description of Tolerance)

Here, it is preferable that the left and right brightness of the display image 5 is most balanced when the ratio (A–A1)/(A–C) of the attenuation region A–A1 to the width A–C of the display image 5 and the ratio (C–C1)/(A–C) of the attenuation region C–C1 to the width A–C of the display image 5 are made equivalent each other, as shown in the above formulae (4) and (6).

However, as described above and as shown in FIG. 11, there are variations in the brightness attenuation start positions (A1, A2, and A3) on the left side A of the display image 5. For this reason, it is difficult to make the ratio (C–C1)/(A–C) of the display image 5 of the attenuation region C–C1 to the width AC and the ratio (A–A1)/(A–C) of the attenuation region A–A1 to the width A–C of the display image 5 equivalent, as shown in the above formulae (4) and (6).

Therefore, it gives some tolerance to the ratio (A–A1)/(A–C) of the attenuation region A–A1 to the width A–C of the display image 5, with respect to the ratio (C–C1)/(A–C) of the attenuation region C–C1 to the width A–C of the display image 5. This tolerance is a range such that in the optical device 1, when the display image 5 is viewed by the human eye E.P, the left and right brightness of the display image 5 is well-balanced, and the user does not feel uncomfortable when looking at the display image 5. The tolerance is about 20% or less, preferably about 10% or less (see formula (5) above).

Hereinafter, the tolerance will be described with reference to FIG. 14A to FIG. 14E. In these drawings, reference numerals A10, A11, A12, A13, and A14 indicate brightness attenuation start positions on the left side A of the display image 5. The horizontal axis X indicates "position of the display image 5" as in the horizontal axis shown in FIGS. 8 to 11. The vertical axis Y indicates "brightness of the display image 5" as in the vertical axis shown in FIGS. 8 to 11. In FIG. 14B to FIG. 14E, the vertical alternate long and short dash line indicates a reference line corresponding to the attenuation start position A10 of the brightness of the left side A of the display image 5 of FIG. 14A.

Figure 14A:
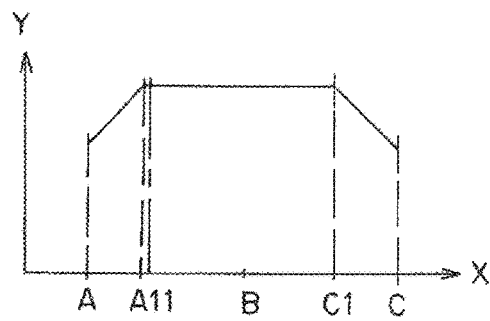
FIG. 14A is an explanatory diagram showing tolerance of the attenuation ratio on the left side of the display image with respect to the attenuation ratio on the right side of the display image, and showing a case where the attenuation region on the left side of the display image and the attenuation region on the right side of the display image are equivalent.

FIG. 14A is an explanatory diagram showing a case where the attenuation region A–A10 on the left side of the display image 5 and the attenuation region C–C1 on the right side of the display image 5 are equivalent as shown in the following formula (13). In this case, the ratio (A–A10)/(A–C) of the attenuation region A–A10 to the width A–C of the display image 5 and the ratio (C–C1)/(A–C) of the attenuation region C–C1 to the width AC of the display image 5 are equivalent, and there is no difference between those.

$$A-A10=C-C1 \tag{13}$$

That is, $$(A-A10) \div (C-C1)=1$$

As a result, the formula (5) becomes the following formula (14).

$$((5/2)\theta 1-\theta 2) \div \arcsin(1/N)=1 \tag{14}$$

Figure 14B:
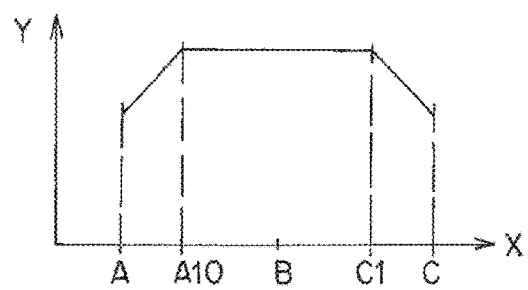
FIG. 14B is an explanatory diagram showing tolerance of the attenuation ratio on the left side of the display image with respect to the attenuation ratio on the right side of the display image, and showing a case where the attenuation region on the left side of the display image is about 0.9 times of the attenuation region on the right side of the display image.

FIG. 14B is an explanatory diagram showing a case where the attenuation region A–A11 on the left side of the display image 5 is about 0.9 times of the attenuation region C–C1 on the right side of the display image 5, as shown in the following formula (15). In this case, the ratio (A–A11)/(A–C) of the attenuation region A–A11 to the width A–C of the display image 5 is about 0.9 times of the ratio (C–C1)/(A–C) of the attenuation region C–C1 to the width A–C of the display image 5. It seems that there is no difference between those.

$$(A-A11) \div (C-C1) \approx 0.9 \tag{15}$$

As a result, the above formula (5) becomes the following formula (16).

$$((5/2)\theta 1-\theta 2)\div \arcsin(1/N) \approx 0.9 \quad (16)$$

Figure 14C:
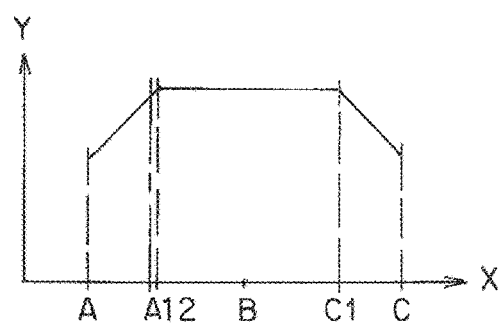
FIG. 14C is an explanatory diagram showing tolerance of the attenuation ratio on the left side of the display image with respect to the attenuation ratio on the right side of the display image, and showing a case where the attenuation region on the left side of the display image is about 1.1 times of the attenuation region on the right side of the display image.

FIG. 14C is an explanatory diagram showing a case where the attenuation region A–A12 on the left side of the display image 5 is about 1.1 times of the attenuation region C–C1 on the right side of the display image 5, as shown in the following formula (17). In this case, the ratio (A–A12)/(A–C) of the attenuation region A–A12 to the width A–C of the display image 5 is about 1.1 of the ratio (C–C1)/(A–C) of the attenuation region C–C1 to the width A–C of the display image 5. It seems that there is no difference between those.

$$(A-A12)\div(C-C1) \approx 1.1 \quad (17)$$

As a result, the above formula (5) becomes the following formula (18).

$$((5/2)\theta 1-\theta 2)\arcsin(1/N) \approx 1.1 \quad (18)$$

Figure 14D:
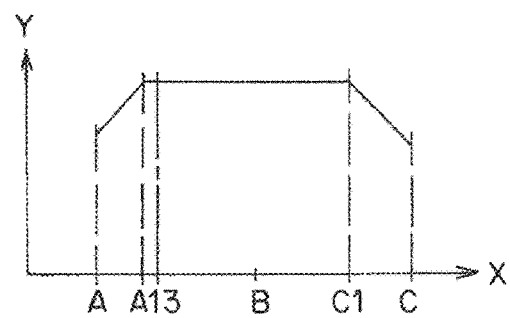
FIG. 14D is an explanatory diagram showing tolerance of the attenuation ratio on the left side of the display image with respect to the attenuation ratio on the right side of the display image, and showing a case where the attenuation region on the left side of the display image is about 0.8 times of the attenuation region on the right side of the display image.

FIG. 14D is an explanatory diagram showing a case where the attenuation region A–A13 on the left side of the display image 5 is about 0.8 times of the attenuation region C–C1 on the right side of the display image 5, as shown in the following formula (19). In this case, the ratio (A–A13)/(A–C) of the attenuation region A–A13 to the width A–C of the display image 5 is about 0.8 times of the ratio (C–C1)/(A–C) of the attenuation region C–C1 to the width A–C of the display image 5. It seems that there is almost no difference between those.

$$(A-A13)=(C-C1) \approx 0.8 \quad (19)$$

As a result, the above formula (5) becomes the following formula (20).

$$((5/2)\theta 1-\theta 2)\div \arcsin(1/N) \approx 0.8 \quad (20)$$

Figure 14E:
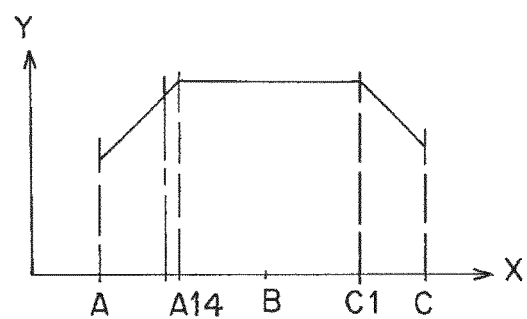
FIG. 14E is an explanatory diagram showing tolerance of the attenuation ratio on the left side of the display image with respect to the attenuation ratio on the right side of the display image, and showing a case where the attenuation region on the left side of the display image is about 1.2 times of the attenuation region on the right side of the display image.

FIG. 14E is an explanatory diagram showing a case where the attenuation region A–A14 on the left side of the display image 5 is about 1.2 times of the attenuation region C–C1 on the right side of the display image 5, as shown in the following formula (21). In this case, the ratio (A–A14)/(A–C) of the attenuation region A–A14 to the width A–C of the display image 5 is about 1.2 times of the ratio (C–C1)/(A–C)) of the attenuation region C–C1 to the width A–C of the display image 5. It seems that there is almost no difference between those.

$$(A-A14)\div(C-C1) \approx 1.2 \quad (21)$$

As a result, the above formula (5) becomes the following formula (22).

$$((5/2)\theta 1-\theta 2)\div \arcsin(1/N) \approx 1.2 \quad (22)$$

(Description of Evaluation Test)

The applicant of this application has carried out evaluation test. Hereinafter, the evaluation test carried out will be described with reference to Table 1. This table shows the evaluation of 10 persons to be tested (related persons of the applicant) by the two optical devices A and B, and the breakdown (gender and age group) of the 10 persons.

TABLE 1

|  | Gender | Age | Devise A | Devise B |
|---|---|---|---|---|
| Person A | Male | Late 50s | ○ | ○ |
| Person B | Female | Early 50s | ○ | ○ |
| Person C | Male | Early 40s | ○ | Δ |
| Person D | Female | Early 40s | ○ | ○ |
| Person E | Female | Early 40s | ○ | ○ |
| Person F | Male | Late 30s | ○ | Δ |

TABLE 1-continued

|  | Gender | Age | Devise A | Devise B |
|---|---|---|---|---|
| Person G | Male | Late 10s | ○ | ○ |
| Person H | Female | Early 20s | ○ | Δ |
| Person I | Female | Late 60s | ○ | ○ |
| Person J | Male | Late 60s | ○ | ○ |

○: Evaluation that the left and right brightness of the displayed image was balanced, and the difference between the left and right brightness was not recognized;

Δ: Evaluation that the left and right brightness of the displayed image was slightly balanced, and a slight difference in left and right brightness was recognized;

x: Evaluation that the left and right brightness of the displayed image was not balanced, and the difference between the left and right brightness was recognized.

In Table 1, the optical device A is an optical device with the ratio (A–A1)/(A–C) of the attenuation region A–A1 to the width A–C of the display image 5 set to about 10 percent or less of the ratio (C–C1)/(A–C) of the attenuation region C–C1 to the width (A–C) of the display image 5. The optical device B is an optical device with the ratio (A–A1)/(A–C) of the attenuation region A–A1 to the width A–C of the display image 5 set to about 20 percent or less of the ratio (C–C1)/(A–C) of the attenuation region C–C1 to the width (A–C) of the display image 5.

As shown in the results of the evaluation tests in Table 1, on the optical device A, all the examinees feel the left and right brightness of the display image 5 are balanced and do not recognize any difference between the left and right brightness. This is because, as shown in FIG. 14B and FIG. 14C, the left and right brightness of the display image 5 is sufficiently balanced, and there seems to be no difference in brightness between the left and right. On the optical device B, 30 percent of the examinees feel the left and right brightness of the display image 5 are almost balanced but recognize a slight difference between the left and right brightness, but 70 percent of the examinees feel the left and right brightness are balanced and do not recognize any difference between the left and right brightness. This is because, as shown in FIG. 14D and FIG. 14E, the left and right brightness of the display image 5 is well-balanced, and there seems to be almost no difference in brightness between the left and right. In the optical devices A and B, none of the examinees (zero percent) have recognized the difference in brightness between the left and right sides of the display image 5.

From the above, on the optical device 1 according to this embodiment, if the permissible range of the ratio (A–A1)/(A–C) of the attenuation region A-A1 to the width A–C of the display image 5 against the ratio (C–C1)/(A–C) of the attenuation region C–C1 to the width A–C of the display image 5 is about 20 percent or less, most users (70 percent of users) do not feel uncomfortable when looking at the displayed image 5. Moreover, on the optical device 1 according to this embodiment, if the permissible range of the ratio (A–A1)/(A–C) of the attenuation region A-A1 to the width A–C of the display image 5 against the ratio (C–C1)/(A–C) of the attenuation region C–C1 to the width A–C of the display image 5 is about 10 percent or less, all users (100 percent of users) do not feel uncomfortable when looking at the displayed image 5.

(Description about Wearable Image Display 100)

Figure 15:
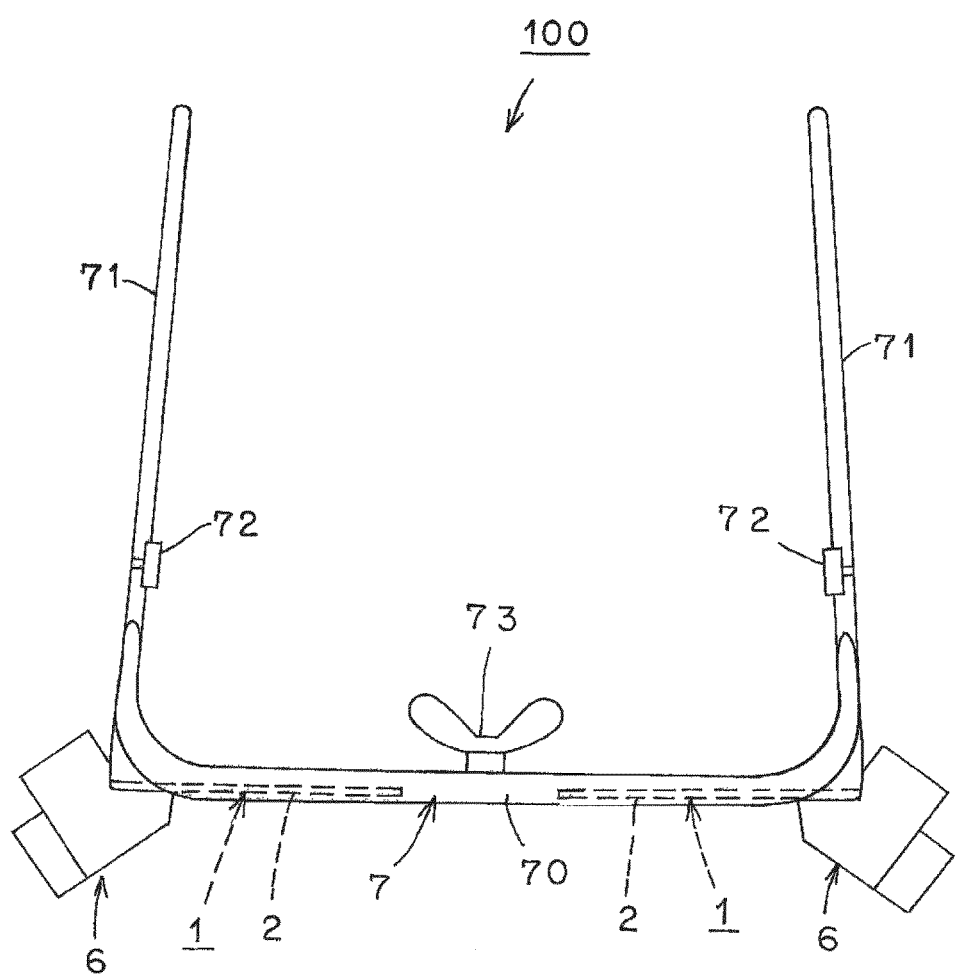
FIG. 15 is a plan view showing an embodiment of a wearable image display according to the present invention.

FIG. 15 shows an embodiment of a wearable image display according to the present invention. Hereinafter, the wearable image display according to this embodiment will be described. In the drawings, reference numeral 100 is a wearable image display according to this embodiment.

As shown in FIG. 15, the wearable image display 100 includes the above-mentioned optical device 1, an image light emitter 6, and a wearing portion 7. The optical device 1 and the image light emitter 6 are separately divided into unit structures, and configured to be detachable from each other. The optical device 1 and the image light emitter 6 may be constructed integrally.

The image light emitter 6 is to output the image light L to the optical device 1 side and causes the image light L to enter the light guide plate 2 via the incident angle adjusting member 4. The image light emitter 6 is, for example, a reflection type projector or the like. The image light emitter 6 may be something other than a reflective projector.

In this example, the wearing portion 7 have a glasses type shape which can be worn on the user's face. The wearing portion 7 includes a front part 70 and left and right temple parts 71 and 71. The left and right temple parts 71 and 71 are foldable to be attached to the left and right ends of the front part 70 via the left and right hinges 72 and 72. A nose pad 73 is provided in the lower part of the center of the front part 70.

The light guide plates 2 of the optical device 1 are attached to the left and right sides of the front part 70 respectively. That is, the light guide plates 2 provided on the left and right sides of the optical devices 1 are attached to both the left and right sides of the front part 70. In addition, in order to protect the light guide plate 2, a transparent plate may be fixed on the surface 20 side of the light guide plate 2. In this case, the transparent plate may be directly attached to the front part 70, and the light guide plate 2 may be indirectly attached to the front part 70 via the transparent plate.

The wearable image display 100 according to this embodiment is configured by detachably attaching the image light emitter 6 to the optical device 1 attached to the wearing portion 7.

Since the wearable image display 100 according to this embodiment includes the optical device 1 according to this embodiment, it is possible to achieve the same action and effect as the optical device 1 according to this embodiment.

(Description of Example Other than the Embodiment)

In the above embodiment, the glasses-type wearing part 7 that is detachably attached to the user's face is used. However, in the present invention, the wearing part may be a wearing part other than the glasses type. For example, it may be a wearing part corresponding to one eye instead of corresponding to both eyes of the user, or a wearing part such as goggles.

Further, in the above-described embodiment, an example in which the optical device (module) 1 is arranged sideways to balance the left and right brightness of the display image 5 will be described. However, in the present invention, it can also be applied to the case where the optical device (module) 1 is arranged vertically to balance the vertical brightness of the displayed image.

The scope of the present invention is not limited to the above embodiment.

REFERENCE SIGNS LIST 1 optical device
2 light guide plate (light guide)
20 main surface (front surface)
21 main surface (back surface)
22 left end side surface
23 right end surface
3 half mirror
30 front surface
31 back surface
4 incident angle adjusting member
40 incident surface
41 joint surface
42 side surface
5 display image
5A left image
5B center image
5C right image
6 image light emitter
7 glasses-type wearing portion
70 front part
71 temple parts
72 hinge
100 nose pad
100 wearable image display
A left side of the display image 5
A1 brightness attenuation start position of the display image 5 due to the light amount reduction on the one side image light LA
A2 brightness attenuation start position of the display image 5 due to the light amount reduction on the one side image light LA
A3 brightness attenuation start position of the display image 5 due to the light amount reduction on the one side image light LA
A10, A11, A12, A13, A14 brightness attenuation start position of the left side A of the display image 5
A-A1 left end A side part of the display image 5 (attenuation region)
b center of the display image 5
C right end of the display image 5
C1 brightness attenuation start position of the display image 5 due to the light amount reduction on the other side image light LC
C-C1 a part of right end C side of the display image 5 (attenuation region)
D target value of refractive index of the half mirror
E.P human eye
G end point
L image light
LA one side image light
LA-LE other part of the image light (a part of the image light L of the one side image light LA, other part of the image light L)
LB center image light
LC other side image light
LC-LD a part of the image light L (a part of the image light L of the other side image light LC, a part of the image light L)
LD image light whose incident angle on the back surface 31 of the half mirror 3 is the reflection characteristic boundary angle $\theta 2$
LE image light whose incident angle on the main surfaces 20 and 21 of the light guide plate 2 is the critical angle $\theta 5$ (arcsin (1/N))
N Refractive index
S start point
$\theta 1$ incident angle of the center image light LB (incident angle of center image light LB on main surfaces 20 and 21)
$\theta 2$ reflection characteristic boundary angle of the half mirror 3

θ3 half of the image light angle (half of the angle corresponding to the display image 5 of the image light L)

θ4 other side mage light angle (the angle at which a part LC-LD of the image light L is reflected on the back surface 31 of the half mirror 3, the angle between the right end C of the display image 5 and the attenuation start position C1: $\{(\theta1+(\frac{1}{2})\theta1)+\theta3-\theta2\})$ θ5 critical angle on the main surfaces 20 and 21 of the light guide plate 2 (arcsin (1/N))

θ6 one side mage light angle (the angle at which the other part LA-LE of the image light L is not totally reflected on the main surface 20 of the light guide 2, The angle from the left end A to the attenuation start position A1 of the display image 5: $[(2\times\theta3)-\{(\theta1+\theta3)-\arcsin(1/N)\}])$

The invention claimed is:

1. An optical device comprising:
a light guide with a main surface;
a plurality of half mirrors arranged in the light guide; and
an incident angle adjusting member,
the light guide being an optical member for guiding incident image light from one part to other part by the light guiding nature of the main surface;
each of the plurality of half mirrors being an optical member displaying a virtual image as a display image by entering into a human eye as the virtual image after making the image light traveling through the light guide by the light guide nature thereof emit outside, and having a reflection characteristic for a part of the image light to be reflected on a back surface opposing to the human eye;
the incident angle adjusting member being an optical member for adjusting the incident angle of the image light on the main surface of the light guide in accordance with the reflection characteristics of each of the plurality of half mirrors to form an image light not satisfying the total reflection condition on the main surface in an other part of the image light, to balance the brightness of the displayed image.

2. The optical device claimed in claim 1, in which:
the image light has an image light angle corresponding to the angle of view of the display image;
a center image light passing through the center line of the image light angle in the image light corresponds to the center of the display image;
a one side image light passing through a half straight line in one side of the image light angle in the image light corresponds to one end of the display image;
an other side image light passing through another half straight line in the other side of the image light angle in the image light corresponds to the other end of the display image;
each of the plurality of half mirrors is an optical member having a reflection characteristic that the incident angle of the image light on the back surface of each of the plurality of half mirrors becomes larger toward the other side image light side, and that the amount of image light on the other side image light side passing through each of the plurality of half mirrors is reduced, because a part of the image light on the other side image light side is reflected on the back surface; and
the incident angle adjusting member is an optical member for adjusting the incident angle of the image light on the main surface of the light guide in accordance with the amount of image light on the other side image light side reduced due to the reflection characteristic of each of the plurality of half mirrors to form an image light not satisfying the total reflection condition on the main surface in a part of the image light on the one side image light side that is the other part of the image light, and reducing the amount of image light on the one sided image light side that is totally reflected on the main surface in the light guide to balance the brightness of the displayed image, when a part of the image light on the one side image light side that does not satisfy the total reflection condition is transmitted from the main surface to the outside.

3. The optical device claimed in claim 2, in which:
the incident angle adjusting member is an optical member for making match an angle ratio of an angle of view of the other side image light side to the image light angle and an angle ratio of an angle of view of the one side image light side to the image light angle, and the angle of view of the other side image light side is an angle of view that a part of the image light on the one side image light side reflected on the back surface, and the angle of view of the one side image light side is an angle of view that a part of the image light on the other side image light side is not totally reflected on the main surface.

4. The optical device claimed in claim 2, in which:
the incident angle adjusting member is an optical member for making match a ratio of an attenuation region from the other end of the display image to a start position where the brightness of the display image is attenuated due to the decrease in the amount of image light on the other side image light side, and a ratio of the attenuation region from one end of the display image to a start position where the brightness of the display image is attenuated due to the decrease in the amount of image light on the one side image light side.

5. The optical device claimed in claim 1, in which:
the incidence angle of the center image light on the main surface is θ1,
a reflection characteristic boundary angle of half mirror is θ2,
a half angle of the image light angle is θ3, and
the refractive index of the light guide is N,
then, following formulae are satisfied:

$$\{(\theta1+(\tfrac{1}{2})\theta1)+\theta3-\theta2\}\div(2\times\theta3) \tag{1}$$

$$[(2\times\theta3)-\{(\theta1+\theta3)-\arcsin(1/N)\}]\div(2\times\theta3) \tag{2}$$

(1)=(2), that is:

$$(3/2)\theta1+\theta3-\theta2=-\theta1+\theta3+\arcsin(1/N) \tag{3}$$

so that:

$$(5/2)\theta1-\theta2-\arcsin(1/N)=0 \tag{4}$$

wherein:
the center image light is the image light that passed through the center line of the angle of view of the image light, and that corresponds to the center of the display image;
the reflection characteristic boundary angle θ2 is a boundary angle at which a rate at which the image light reflected on the back surface of each of the plurality of half mirrors increases;
the formula (1) indicates an angle ratio of the other side image light angle $\{(\theta1+(\frac{1}{2})\theta1)+\theta3-\theta2\}$ to the image light angle $(2\times\theta3)$, and the other side image light angle $\{(\theta1+(\frac{1}{2})\theta1)+\theta3-\theta2\}$ is an angle of view that a part of image light of the one side image light side to be reflected on the back surface;

the formula (2) indicates an angle ratio of the one side image light angle $[(2\times\theta3)-\{(\theta1+\theta3)-\arcsin(1/N)\}]$ to the image light angle $(2\times\theta3)$, and the one side image light angle $[(2\times\theta3)-\{(\theta1+\theta3)-\arcsin(1/N)\}]$ is an angle of view that a part of the image light on the one side image light not to be totally reflected on the main surface;

the formula (3) is an equation in which the angle ratio of the formula (1) and the angle ratio of the formula (2) are connected by equality; and the formula (4) is an arrangement of the formula (3).

6. The optical device claimed in claim 5, in which:

the following formula is satisfied:

$$0.9 \leq ((5/2)\theta1-\theta2) \div \arcsin(1/N) \leq 1.1 \qquad (5).$$

7. A wearable image display, comprising:

the optical device according to claim 1, an image light output part attached to the optical device to output image light to the optical device, and a wearing part for wearing the optical device and the image light output part on a user's face.

\* \* \* \* \*